April 25, 1950     W. B. JONES, JR     2,505,549
INTEGRATING CIRCUIT
Filed Sept. 14, 1945
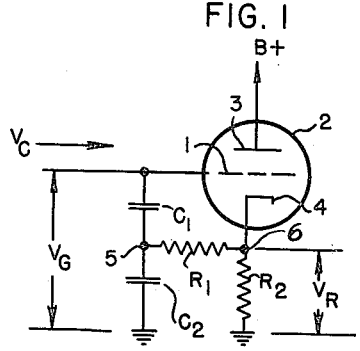
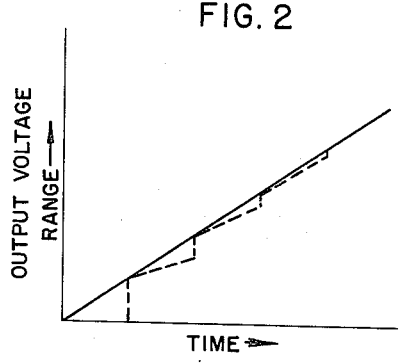
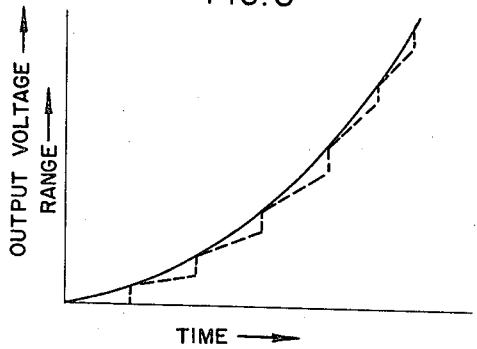
INVENTOR
WILLIAM B. JONES JR.
BY
ATTORNEY Patented Apr. 25, 1950

2,505,549

UNITED STATES PATENT OFFICE 2,505,549

INTEGRATING CIRCUIT

William B. Jones, Jr., Belmont, Mass., assignor, by mesne assignments, to the United States of America as represented by the Secretary of War Application September 14, 1945, Serial No. 616,380

6 Claims. (Cl. 250—27)

This invention relates in general to an electrical integrating or memory circuit, and more particularly to such circuits as are designed primarily to be used in the range and azimuth tracking circuit of a radio detection and ranging set.

In radio detection devices, using a PPI scan in which the directional antenna sweeps through 360 degrees, the specific target in which the operator is interested may be in the beam only a small fraction of the time, sometimes only 5 percent of the total time. In order to supply data to a computing sight which can be utilized by the sight, a so-called "memory" circuit must be devised which can supply reasonably smooth and accurate data as to the range of the target during the period when the target is not in the transmitted beam. The memory circuit must be of such a type that the indication of range supplied by it can be instantly corrected during the short period when the transmitted beam includes the target, and also of such a type that the rate of increase or decrease of the range indication of the circuit can be adjusted in accordance with the actual rate of increase or decrease of range of the target. Accordingly it is one of the objects of my invention to provide such a circuit.

The output of the memory circuit of the invention is a voltage which is directly proportional to the range. The range indication of this circuit is corrected by means of voltage pulses, proportional to the error, which are applied to the grid at intervals. The correcting voltage pulses can be obtained as set forth hereinafter, although the manner in which the correcting voltage is obtained per se is not the essence of my invention. Two pulses, one the echo pulse from the target and the other the same pulse but delayed a predetermined amount behind the echo pulse, are applied to a detector. When a range gate is applied to this detector a pulse of voltage will be obtained which is proportional to the error. If the range gate is delayed such an amount as to be exactly symmetrical with respect to the two pulses (with respect to time) there will be no corrective voltage output. The amount of delay of the range gate is determined by the voltage output of the memory circuit which is fed to a linear delay circuit in which the delay is directly proportional to the voltage applied. Therefore among the objects of the invention are:

1. To devise a memory circuit, the output of which can be instantly corrected to the proper value.

2. To devise a memory or integrating circuit which can be "taught" to indicate a rate of decrease or increase in range approximately that of the actual target.

Other objects and advantages will become readily apparent from the hereinafter described specification.

The invention in general contemplates the use of a vacuum tube with its anode connected to a source of positive potential. The grid of said tube is connected to ground through two relatively large series capacitors. The cathode is connected to ground through a resistor. The common junction of the two capacitors is connected to the cathode by means of a relatively large resistor. The two capacitors should have very low leakage and the cathode resistor should preferably have a value much larger than the plate resistance of the tube. The potential on the cathode, as in all cathode followers, will closely follow the potential on the grid. The capacitor, connected to ground, charges and discharges through the resistor connecting it to the cathode. The potential on the cathode will increase or decrease at a very slow rate. The rate of increase or decrease will depend on the amplitude and frequency of the corrective pulses applied to the grid. If many positive pulses are received, the charging rate will be increased. If a large number of negative corrective pulses are received, the charging rate will decrease. In this circuit, the time constant for charging the capacitor is many times the product of the value of the capacitor times the value of the series resistor.

In the drawings:

Fig. 1 shows the preferred embodiment of the memory circuit;

Fig. 2 is a graph showing the corrective action of the circuit with constant relative velocity; and Fig. 3 is a graph showing further a corrective action of the circuit.

Turning now to the detailed description of the figure, Fig. 1 shows the preferred embodiment of the invention.

In this figure the corrective voltage $V_c$ is applied to the grid 1 of vacuum tube 2. The anode 3 of the vacuum tube is connected to a source of positive potential. The cathode 4 is connected to ground or to a source of negative bias through resistor $R_2$. The grid 1 is connected to ground through two capacitors $C_1$ and $C_2$. The junction of the two capacitors, point 5, is connected to the cathode 4 through a resistor $R_1$. The voltage proportional to the range ($V_r$) is taken off between point 6 and ground.

The grid 1 is isolated from ground at all times except during the brief period when corrective voltage pulses are applied to it from the detector. This means that after the corrective voltage pulses have been applied, the only connection to ground for the grid is the leakage resistance of capacitor $C_1$. The capacitors $C_1$ and $C_2$ (particularly $C_1$) are chosen to have very high leakage resistance. These capacitors are usually relatively large, i. e., of the order of 2 or 3 microfarads. The resistor $R_1$ is usually relatively large, i. e., of the order of several megohms. The value of resistor $R_2$ is not critical but its resistance should be much greater than the plate resistance of the tube.

If a positive pulse of corrective voltage is applied to the grid, the potential at point 6 will rise almost as much as the grid potential rises and the potential at point 5 will also rise but by a much smaller amount. The potential $V_G$ on the grid will bear a substantially constant relationship to the potential $V_R$ at point 6 as in any cathode follower circuit. The relationship is:

$$V_R = V_G \left( \frac{\mu R_2}{R_2(\mu+1) + r_P} \right)$$

where:
$\mu$ = amplification factor of the tube
$r_P$ = plate resistance of the tube.

It can be readily seen that the relationship between $V_G$ and $V_R$ will be constant if $\mu$ and $r_P$ remain constant. $V_R$ will usually be about 90% of $V_G$.

The potential at point 5 will be less than the potential at point 6 and current will flow through resistor $R_1$ to charge capacitor $C_2$. Capacitor $C_1$ tends to acquire a constant charge and will therefore have a constant voltage drop across it. It is essential that the leakage across this capacitor be very low in order to maintain this charge.

It can be readily seen that the potential at point 6 will instantly follow any change in potential on the grid due to the corrective voltage pulses. During the period between pulses, the potential at point 6 will continue to rise at a very slow rate. The reason for this is that as the potential at point 5 increases, due to charging capacitor $C_2$ through resistor $R_1$, the potential on the grid will also rise and the potential at point 6 will rise due to cathode follower action. The "memory" time constant for the circuit will be:

$$T = \frac{\mu R_1 C_2}{1 + \frac{r_P}{R_2}}$$

If resistor $R_2$ is much larger in value than the plate resistance of the tube, T will be many times $R_1 C_2$, the time constant for $R_1$ and $C_2$ in series. This memory time constant can be made as much as 200 seconds.

This circuit can also be "taught" so that the rate of increase of potential at point 6 will substantially conform to the rate of increase of range. If no corrective pulses of voltage have been received at the grid, the potential at point 6 will continue to rise almost linearly due to the very long time constant. If, however, the potential at point 6 has been increasing more slowly than it should have increased due to variation in range, a number of positive corrective pulses will be received and the potential at point 6 will increase instantly to the proper value. This brings about a greater potential difference between points 5 and 6 and will cause capacitor $C_2$ to charge more rapidly.

The converse is true if the potential at point 6 is increasing too rapidly due to a decrease in relative velocity between the target and detector. Negative pulses will be received at the grid which will instantly reduce the potential at point 6 to the proper value and also reduce the rate at which capacitor $C_2$ is charged.

In Figs. 2 and 3 the actual distance between the target and the detector is plotted as a solid line against time. The output voltage from the "memory" circuit is plotted as a dotted line against time. The solid line will be referred to as the "range" line hereinafter since it shows the actual range of the target at any given time. The scales of range and output voltage have been so chosen that when the line showing output voltage from the "memory" circuit coincides with the range line, it indicates that the value of output voltage is correct and no corrective pulses of voltage will be received at the grid until the two lines begin to deviate. If the dotted line is below the range line, positive corrective pulses are applied to the grid. If the dotted line is above the range line, negative corrective pulses will be applied to the grid.

In the graph of Fig. 2, the solid line shows a constant relative velocity between target and detector which gives a linear increase in range. The dotted line shows the manner in which output voltage of the memory circuit is corrected until the slope of the output voltage line of the "memory" circuit is the same as the slope of the range line. The graph is started at zero range for simplification.

In the graph of Fig. 3, the solid line shows a relative velocity between target and detector which is constantly increasing. The dotted line shows the output voltage of the memory circuit which never quite succeeds in coinciding exactly with the range line. The output voltage line is substantially a straight line due to the long time constant and can never exactly follow such a range line. It can, however, by proper selection of the memory time constant, be made to follow it sufficiently closely for most practical purposes. The simplest way to adjust the memory time constant would be to change the value of $R_1$.

Some representative values for the components to be used in the circuit of Fig. 1 would be:

$C_1 = C_2 = 2$ microfarads
$R_1 = 2$ megohms
$R_2 = 100{,}000$ ohms

The time constant, using a tube such as a 6J5, would be approximately 75 seconds. $V_R$ would be approximately 94% of $V_G$.

The values given in the specification are merely illustrative and should not be construed as limiting the invention to the values set forth or to the particular tube type mentioned.

It will be apparent that there may be deviations from the invention as described which still fall fairly within the spirit and scope of the invention.

Accordingly I claim all such deviations which fall fairly within the spirit and scope of the invention as identified in the hereinafter appended claims.

What is claimed is:

1. An electrical integrating circuit comprising a vacuum tube having an anode, a cathode and at least one grid, means connecting said grid to a source of corrective voltage pulses, resistor means connecting said cathode to a source of reference potential, means connecting said anode electrically to a source of positive potential, two series capacitors connecting said grid to said source of reference potential and resistor means connecting the junction of said two capacitors to said cathode, whereby the effective time constant of the circuit from cathode to said source of reference potential is several times the product of the resistance and capacitance in said circuit.

2. An electrical integrating circuit as in claim 1 in which the resistance of the cathode resistor is much larger than the plate resistance of said vacuum tube.

3. An electrical integrating circuit comprising a vacuum tube having an anode, a cathode and a control grid, means connecting said anode to a source of positive potential, resistor means connecting said cathode to a source of reference potential, two series capacitors connecting said control grid to said source of reference potential, resistor means connecting the junction of said two capacitors to said cathode and means connecting said control grid to a source of potential which is adapted to apply corrective pulses of voltage at regular intervals to cause the potential on said cathode to vary in accordance with a predeterminable pattern.

4. An electrical integrating circuit comprising a vacuum tube having an anode, a cathode and a control grid, means connecting said anode to a source of positive potential, a capacitor, and a resistor in series with said capacitor, said combination connecting said cathode to ground, a second resistor in shunt with said combination, a second capacitor connecting said control grid to said first capacitor, whereby the time constant for charging said first capacitor will be several times the product of the values of said first resistor and said first capacitor.

5. An electrical integrating circuit comprising a vacuum tube, having an anode connected to a source of positive potential, a cathode and a control grid, a pair of capacitors connected in series connecting said grid to ground and resistor means connecting respectively said cathode to ground and the junction of said capacitors to said cathode, whereby the potential of said cathode may be controlled by corrective pulses of voltage applied to said control grid.

6. An electrical integrating circuit including a vacuum tube having an anode connected to a source of positive potential, at least one grid receptive of corrective voltage pulses, and a cathode, first resistor means connecting said cathode to a source of reference potential, two series capacitors connected between said grid and said source of reference potential, and second resistor means connecting said cathode to the junction of said two capacitors, whereby said corrective voltage pulses cause the potential on said cathode to vary in accordance with a predeterminable pattern.

WILLIAM B. JONES, Jr.

REFERENCES CITED

The following references are of record in the file of this patent:

UNITED STATES PATENTS

| Number | Name | Date |
| --- | --- | --- |
| 2,265,290 | Knick | Dec. 9, 1941 |
| 2,279,007 | Mortley | Apr. 7, 1942 |

OTHER REFERENCES

Time Bases—Their Design and Development by O. S. Puckle, page 96. (Copy in Division 10.)